US011055888B2

(12) United States Patent
Han et al.

(10) Patent No.: US 11,055,888 B2
(45) Date of Patent: Jul. 6, 2021

(54) APPEARANCE-FLOW-BASED IMAGE GENERATION

(71) Applicant: Shenzhen Malong Technologies Co., Ltd., Shenzhen (CN)

(72) Inventors: Xintong Han, Shenzhen (CN); Xiaojun Hu, Shenzhen (CN); Weilin Huang, Shenzhen (CN); Matthew Robert Scott, Shenzhen (CN)

(73) Assignee: Shenzhen Malong Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/553,094

(22) Filed: Aug. 27, 2019

(65) Prior Publication Data

US 2021/0065418 A1    Mar. 4, 2021

(51) Int. Cl.
| | |
|---|---|
| *G06T 7/12* | (2017.01) |
| *G06T 11/60* | (2006.01) |
| *G06T 3/00* | (2006.01) |
| *G06T 7/73* | (2017.01) |
| *G06T 7/11* | (2017.01) |

(52) U.S. Cl.
CPC ............ *G06T 11/60* (2013.01); *G06T 3/0093* (2013.01); *G06T 7/11* (2017.01); *G06T 7/73* (2017.01); *G06T 2207/30196* (2013.01)

(58) Field of Classification Search
CPC .................................. G06T 11/60; G06T 7/11
USPC ........................................................ 345/634
See application file for complete search history.

(56) References Cited

U.S. PATENT DOCUMENTS

| | | | | |
|---|---|---|---|---|
| 2011/0096183 | A1* | 4/2011 | Robertson | ............... G06T 11/60 348/222.1 |
| 2014/0176565 | A1* | 6/2014 | Adeyoola | ........... G06F 16/5854 345/473 |
| 2014/0333614 | A1* | 11/2014 | Black | ...................... G06T 19/20 345/419 |
| 2016/0035061 | A1* | 2/2016 | Gadre | ................ G06Q 30/0601 345/473 |
| 2017/0046830 | A1* | 2/2017 | Zhao | ......................... G06T 7/12 |
| 2018/0012385 | A1* | 1/2018 | Choi | ...................... A41H 3/007 |

OTHER PUBLICATIONS

R. Alp Güler, N. Neverova, and I. Kokkinos. Densepose: Dense human pose estimation in the wild. In CVPR, 2018.
G. Balakrishnan, A. Zhao, A. V. Dalca, F. Durand, and J. Guttag. Synthesizing images of humans in unseen poses. In CVPR, 2018.
Z. Cao, T. Simon, S.-E. Wei, and Y. Sheikh. Realtime multiperson 2d pose estimation using part affinity fields. In CVPR, 2017.
(Continued)

*Primary Examiner* — Thomas J Lett
(74) *Attorney, Agent, or Firm* — Shook, Hardy & Bacon, L.L.P.

(57) ABSTRACT

Aspects of this disclosure include technologies for appearance-flow-based image generation. In applications for pose-guided person image generation or virtual try-on, the disclosed system can model the appearance flow between source and target clothing regions. Further, a cascaded appearance flow estimation network is used to progressively refine the appearance flow. The resulting appearance flow can properly encode the geometric changes between the source and the target for image generation.

17 Claims, 7 Drawing Sheets

(56) References Cited

OTHER PUBLICATIONS

H. Dong, X. Liang, K. Gong, H. Lai, J. Zhu, and J. Yin. Softgated warping-gan for pose-guided person image synthesis. In NeurIPS, 2018.

H. Dong, X. Liang, B. Wang, H. Lai, J. Zhu, and J. Yin. Towards multi-pose guided virtual try-on network. arXiv preprint arXiv:1902.11026, 2019.

A. Dosovitskiy, P. Fischer, E. Ilg, P. Hausser, C. Hazirbas, V. Golkov, P. Van Der Smagt, D. Cremers, and T. Brox. Flownet: Learning optical flow with convolutional networks. In CVPR, 2015.

P. Esser, E Sutter, and B. Ommer. A variational u-net for conditional appearance and shape generation. In CVPR, 2018.

L. A. Gatys, A. S. Ecker, and M. Bethge. Image style transfer using convolutional neural networks. In CVPR, 2016.

K. Gong, X. Liang, Y. Li, Y. Chen, M. Yang, and L. Lin. Instance-level human parsing via part grouping network. In ECCV, 2018.

A. Grigorev, A. A Sevastopolsky, A. Vakhitov, and L. Victor. Coordinate-based texture inpainting for pose-guided image generation. arXiv preprint arXiv:1811.11459, 2018.

X. Han, Z. Wu, W. Huang, M. R. Scott, and L. S. Davis. Compatible and diverse fashion image inpainting. arXiv preprint arXiv:1902.01096, 2019.

X. Han, Z. Wu, Z. Wu, R. Yu, and L. S. Davis. Viton: An image-based virtual try-on network. In CVPR, 2018.

K. He, X. Zhang, S. Ren, and J. Sun. Deep residual learning for image recognition. In CVPR, 2016.

T.-W. Hui, X. Tang, and C. C. Loy. Liteflownet: A lightweight convolutional neural network for optical flow estimation. In CVPR, 2018.

E. Ilg, N. Mayer, T. Saikia, M. Keuper, A. Dosovitskiy, and T. Brox. Flownet 2.0: Evolution of optical flow estimation with deep networks. In CVPR, 2017.

P. Isola, J.-Y. Zhu, T. Zhou, and A. A. Efros. Image-to-image translation with conditional adversarial networks. In CVPR, 2017.

M. Jaderberg, K. Simonyan, A. Zisserman, et al. Spatial transformer networks. In NeurIPS, 2015.

N. Jetchev and U. Bergmann. The conditional analogy gan: Swapping fashion articles on people images. In ICCVW, 2017.

D. Ji, J. Kwon, M. McFarland, and S. Savarese. Deep view morphing. In CVPR, 2017.

J. Johnson, A. Alahi, and L. Fei-Fei. Perceptual losses for real-time style transfer and super-resolution. In ECCV, 2016.

A. Kanazawa, D. W. Jacobs, and M. Chandraker. Warpnet: Weakly supervised matching for single-view reconstruction. In CVPR, 2016.

D. Kingma and J. Ba. Adam: A method for stochastic optimization. arXiv preprint arXiv:1412.6980, 2014.

C. Lassner, G. Pons-Moll, and P. V. Gehler. A generative model of people in clothing. In ICCV, 2017.

T.-Y. Lin, P. Dollár, R. B. Girshick, K. He, B. Hariharan, and S. J. Belongie. Feature pyramid networks for object detection. In CVPR, 2017.

Z. Liu, P. Luo, S. Qiu, X. Wang, and X. Tang. Deepfashion: Powering robust clothes recognition and retrieval with rich annotations. In CVPR, 2016.

L. Ma, X. Jia, Q. Sun, B. Schiele, T. Tuytelaars, and L. Van Gool. Pose guided person image generation. In NeurIPS, 2017.

L. Ma, Q. Sun, S. Georgoulis, L. Van Gool, B. Schiele, and M. Fritz. Disentangled person image generation. In CVPR, 2018.

N. Neverova, R. A. Guler, and I. Kokkinos. Dense pose transfer. In ECCV, 2018.

A. Raj, P. Sangkloy, H. Chang, J. Lu, D. Ceylan, and J. Hays. Swapnet: Garment transfer in single view images. In ECCV, 2018.

A. Ranjan and M. J. Black. Optical flow estimation using a spatial pyramid network. In CVPR, 2017.

I. Rocco, R. Arandjelovic, and J. Sivic. Convolutional neural network architecture for geometric matching. In CVPR, 2017.

O. Ronneberger, P. Fischer, and T. Brox. U-net: Convolutional networks for biomedical image segmentation. In MIC-CAI, 2015.

T. Salimans, I. Goodfellow, W. Zaremba, V. Cheung, A. Radford, and X. Chen. Improved techniques for training gans. In NeurIPS, 2016.

A. Siarohin, E. Sangineto, S. Lathuilière, and N. Sebe. Deformable gans for pose-based human image generation. In CVPR, 2018.

K. Simonyan and A. Zisserman. Very deep convolutional networks for large-scale image recognition. In ICLR, 2015.

D. Sun, X. Yang, M.-Y. Liu, and J. Kautz. Pwc-net: Cnns for optical flow using pyramid, warping, and cost volume. In CVPR, 2018.

B. Wang, H. Zheng, X. Liang, Y. Chen, L. Lin, and M. Yang. Toward characteristic-preserving image-based virtual try-on network. In ECCV, 2018.

K. Wang, L. Ma, J. Oramas M., L. Van Gool, and T. Tuytelaars. Integrated unpaired appearance-preserving shape translation across domains. arXiv preprint arXiv:1812.02134, 2018.

Z. Wang, A. C. Bovik, H. R. Sheikh, and E. P. Simoncelli. Image quality assessment: from error visibility to structural similarity. IEEE TIP, 2004.

Z. Wu, G. Lin, Q. Tao, and J. Cai. M2e-try on net: Fashion from model to everyone. arXiv preprint arXiv:1811.08599, 2018.

C. Zach, T. Pock, and H. Bischof. A duality based approach for realtime tv-l 1 optical flow. In Joint pattern recognition symposium, 2007.

T. Zhou, S. Tulsiani, W. Sun, J. Malik, and A. A. Efros. View synthesis by appearance flow. In ECCV, 2016.

J.-Y. Zhu, Z. Zhang, C. Zhang, J. Wu, A. Torralba, J. Tenenbaum, and B. Freeman. Visual object networks: image generation with disentangled 3d representations. In NeurIPS, 2018.

S. Zhu, S. Fidler, R. Urtasun, D. Lin, and C. L. Chen. Be your own prada: Fashion synthesis with structural coherence. In ICCV, 2017.

* cited by examiner

APPEARANCE-FLOW-BASED IMAGE GENERATION

BACKGROUND

Electronic commerce (ecommerce) represents a growing share of the retail market. Except for some goods or services that are not typically bought online like fuel from gas stations or dining experience at restaurants, online shopping has empowered consumers to directly buy virtually any goods or services over the Internet and enjoy them after delivery in the comfort of their own homes. However, ecommerce has some limitations. By way of example, online clothes and fashion shoppers are primarily concerned about how an outfit will look on their own bodies. Further, mixing and matching clothes is a basis for outfit planning. Unfortunately, unlike in brick-and-mortar retailers, online shoppers generally cannot mix and match clothes online or try clothes online. Advances in technology are desirable for online clothes and fashion shopping.

Computer-generated imagery (CGI) has a wide range of applications in television programs, films, video games, scientific researches, computer-aided designs, virtual reality applications, ecommerce, etc. For example, CGI is routinely used to create unique characters or special effects, e.g., in a science fiction (Sci-Fi) film or a cartoon-based commercial. To some extent, the modern development of many fields, including the film industry, the video game industry, the advertising industry, etc., is closely related to computer graphics.

Even with the advancement of graphical processing units (GPU) and advanced algorithms in computer graphics, CGI often involves high complexity in both computational space and time. For example, in a cartoon film, a character may need to change clothes, which would require thousands if not millions of computer generated images for the character changing into the new clothes. Even with the same clothing, when the character moves, the clothes may need to be rendered to be consistent with the movement, which would require many new computer generated images. This process can quickly become burdensome if each computer generated image requires its own graphical design. New technologies are needed to change the appearance of the character, such as changing the clothes, without requiring new graphical designs.

SUMMARY

This Summary is provided to introduce selected concepts that are further described below in the Detailed Description. This Summary is not intended to identify key features or essential features of the claimed subject matter, nor is it intended to be used as an aid in determining the scope of the claimed subject matter.

This disclosure includes a technical solution for appearance-flow-based image generation, or specifically, for generating a synthesized image based on an appearance flow, which, among other things, models the estimated geometric changes for transferring the appearance from a source to a target. To do that, in various embodiments, after receiving a source object, the disclosed system can identify a source segmentation map of the source object. Further, the disclosed system can synthesize a target segmentation map based on the source segmentation map and a target pose. Further, the disclosed system can determine an appearance flow from the source to the target. Accordingly, the disclosed system can warp at least a part of the source based on the appearance flow. Lastly, the disclosed system can utilize a generation network to generate a target image based on the warped part of the source.

In various aspects, systems, methods, and computer-readable storage devices are provided to improve a computing device's ability to generate realistic synthesized images. One aspect of the technology described herein is to improve a computing device's ability to estimate a dense flow specifying correlated pixels between a source image and a target image. Another aspect of the technology described herein is to improve a computing device's ability to reconstruct a warped object to account for geometric deformation. Another aspect of the technology described herein is to improve a computing device's ability to transfer the appearance of a first object in a first image to a second object in a second image, including transferring detailed visual features with natural deformations.

BRIEF DESCRIPTION OF THE DRAWING

The technology described herein is illustrated by way of example and not limited in the accompanying figures in which like reference numerals indicate similar elements and in which.

DETAILED DESCRIPTION

The various technologies described herein are set forth with sufficient specificity to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, the term "based on" generally denotes that the succedent condition is used in performing the precedent action.

For online clothes and fashion shopping, unlike in brick-and-mortar retailers, online shoppers are generally unable to mix and match clothes online or try clothes online. To resolve consumers' concerns, online retailers traditionally hire models to create catalog images for new articles of clothing, sometimes even for different styles of the same article of clothing, e.g., for different colors. However, this solution is not only too expensive, but does not address the root of the concerns. By way of example, a dress that looks marvelous on a model does not necessarily mean that the same dress would fit every shopper. Further, online retailers cannot predict every shopper's preference for putting together outfits, including mixing and matching clothes from different categories. Accordingly, online retailers need new technologies for synthesizing model pictures with different clothes.

From a consumer's perspective, online fashion shoppers may end up with a somewhat subpar experience. To mitigate the risks of unfitness, some seasoned online shoppers would order clothes in different styles/sizes/colors/etc. online, but return most of them after trying the items on. A high return rate impedes the ecommerce by hurting the profit margin of online retailers. Further, not every returned item is resalable. When returned items end up in a landfill, it causes undue pressure on the environment. Accordingly, online shoppers need new technologies for virtually trying on clothes or mixing/matching clothes online.

Similarly, in the fashion design industry, new technologies for virtually trying on clothes or mixing/matching clothes may greatly expedite the design process and economically produce better fashion articles. Such new technologies could also be used in other types of industry, such as in the film industry or the video game industry. For example, a video game character may need to change clothes. Even more routinely, to create the photorealism in games, the appearance of the same clothes on the video game character need to dynamically change in real time based on the movement of the character. Further, such new technologies could also allow players to custom design their own characters with customized outfits.

To enable or improve the aforementioned new functions, such new technologies should be able to realistically transfer appearance of an object (e.g., an article of clothing) from one image to another. Conventional technologies are insufficient to achieve this purpose.

One conventional approach is to use an image-to-image translation network to reconstruct the target from the source. Although such approaches can synthesize some parts realistically, e.g., some skin regions, they fail to preserve clothing details due to their failures for considering the spatial deformation of the clothing induced by pose changes. For example, recent advances in generative adversarial networks (GANs) have demonstrated impressive results on image generation. Some conventional systems started using GANs for image-to-image translation, e.g., by feeding source images to GANs to synthesize target images. However, such systems can only process information like object classes and attributes roughly, but are unable to generate graphic details and accommodate geometric changes. Particularly, the non-rigid nature of clothes typically causes drastic deformations and severe occlusions, which cannot be properly handled by such systems. Resultantly, their performance of rendering clothing details (e.g., patterns, graphics, logos, etc.) in the target view is very limited.

Some existing methods try to estimate the transformations in a non-learnable fashion. For example, they use key point locations or clothing masks to compute the parameters of a transformation. Those methods are unaware of the appearance correspondence and can only roughly align textures.

Some existing geometric modeling systems try to improve appearance transfer by taking the geometric deformation into consideration. For example, many conventional deformation-based systems may estimate a transformation, either affine or thin plate spine (TPS), to deform the source image pixels or convolutional feature maps to partially cope with the misalignment introduced by pose differences between the source and the target. But TPS transformation can only model limited geometric changes and might unnaturally deform the source. In other words, those conventional systems typically only have limited degrees of freedom, which leads to inaccurate and unnatural transformation estimations, especially when large geometric changes occur.

Other existing mapping-based systems have tried to improve appearance transfer by mapping pixels of a 2D image to the 3D human body surface. However, warping 2D image textures to the predefined surface-based coordinate system further introduces artifacts, e.g., holes produced in positions that are invisible in the source image and need to be addressed by complicated texture inpainting algorithms. The results from these mapping-based systems look even less photorealistic than previously discussed deformation-based systems.

In this disclosure, a technical solution is provided to estimate the clothing deformation between the source and target images based on an appearance-flow-based generative model. The estimated appearance flow, also known as flow field, may then be used to realistically transfer appearance of an object (e.g., one or more articles of clothing) from the source image to the target image. This appearance-flow-based technology thus may be used to enable trying clothes online, mixing and matching clothes online, synthesizing clothed characters for films or video games, and many other practical applications.

By estimating a dense flow between the corresponding source and target regions, the disclosed technology can effectively model geometric changes and naturally transfer the appearance of the source region to the target region. In some embodiments, the source and target regions are clothed regions. Thus, the disclosed appearance-flow-based generative model can synthesize posed-guided clothed characters, e.g., by transferring an article of clothing from a source image to a target image. In other embodiments, the source and target regions may refer to other regions, such as the skin of a character or a blanket on a sofa. By way of example, the disclosed technology may be used to transfer the skin of a leopard to a customized avatar in a video game, or changing the pattern of a blanket on a sofa.

To synthesize a new character, given a source image $I_s$ and a target pose $p_t$, the disclosed system is to synthesize the target character $I_t$, whose pose is $p_t$ but have the appearance as $I_s$. As a pose-guided image synthesis system, the disclosed system is to preserve the texture details in the source image. To do that, in some embodiments, the disclosed system is to explicitly estimate an appearance flow, e.g., a 2D dense flow field, which specifies which pixels in the source image could be redirected to reconstruct the target image.

At a high level, the disclosed appearance-flow-based generative model includes three main stages. At the first stage, conditioned on a target pose and the source, a semantic layout of the target is estimated. The target semantic layout will provide guidance for the image generation process. Based on the semantic layout, the disclosed model can disentangle the generation of shape and appearance, thus producing spatially coherent results.

At the second stage, a cascaded flow estimation network is used to accurately estimate the appearance matching between the source and the target. The semantic layout may be used as an input to the cascaded flow estimation network, which outputs the resulting appearance flow (e.g., 2D coordinate vectors). The appearance flow indicates which pixels in the source can be used to synthesize the target. Thus, this appearance flow can be used to warp the source to account for deformations, e.g., based on the target pose.

At the third stage, the appearance-flow-based generative model may take the warped source as input and render the target. In this way, the appearance flow offers accurate estimation of the visual correspondences between the source and the target, and helps to seamlessly transfer the appearance of the source to the target.

In contrast to many deformation-based methods utilizing a geometric transformation with few degrees of freedom, the disclosed model estimates a dense flow field (e.g., 2×256×256) allowing high flexibility and accuracy when capturing the spatial deformations. Further, differing from many pose-based methods that explicitly utilize 3D body surface to transfer textures, the disclosed model implicitly captures the geometric transformation by warping the source with the appearance flow and transferring the appearance of the source to the target.

For virtual try-on or garment transfer, the disclosed appearance-flow-based generative model can take the clothing product image as input and warp it more naturally and seamlessly onto the target person. Specifically, based on the appearance flow, the deformation can be accurately estimated between the clothing region (e.g., a shirt) in the source image (e.g., a product image) and the corresponding region (e.g., the top segment) in the target person.

Advantageously, the cascaded flow estimation network can precisely predict, in a cascaded manner, the appearance flow to align the source and target. In each cascaded stage, a feature warping module progressively improves the estimated appearance flow of previous stages and better approximates the desired spatial deformation, which may be conditioned on the target pose. Unlike most optical flow estimation methods that need to search matching features in a local range, the disclosed model estimates the appearance flow with the features extracted on the whole image and does not struggle to model long-range correspondence or partial observability. Also, many conventional methods usually require a computationally expensive cost volume, which is used to calculate the similarity between corresponding regions between the source and target with quadratic computation complexity. In contrast, the disclosed model here does not require the computationally expensive cost volume. Instead, the disclosed model achieves satisfactory performance with a cascaded refinement process to predict the appearance flow.

Advantageously, the resulting appearance flow can accurately account for the geometric changes between the source and target, and also address the occlusion issues (e.g., when arm and hair occlude the clothes) and the partial observability issues (e.g., stretching pants region). As a result, this disclosed technology can make photorealistic appearance transfer from a source to a target. This technology may be used for enabling online shoppers to virtually try on clothes or mixing/matching clothes online, enabling game players to custom design their own characters with customized outfits, or other interesting applications.

Experimentally, the disclosed technology has been evaluated on DeepFashion dataset. In comparison, the disclosed model synthesizes more realistic pose-guided images by preserving detailed clothing textures compared to other state-of-the-art methods. Further, the disclosed model also achieved promising results on VITON dataset for virtual try-on tasks. The experiments demonstrate that the disclosed system naturally deforms the clothing image conditioned on the target person and renders try-on results with clothing details preserved.

Experimental results also demonstrate that the disclosed system predicts more accurate deformations than existing methods that compute a thin plate spline (TPS) transformation. The TPS transformation has much fewer transformation parameters and fails to model highly non-rigid transformations. Further, those existing methods estimate the transformation in a late stage of a feature encoder (e.g., 4×4 feature map in the 6-th convolutional layer), hence losing the low-level information in the early stages.

Having briefly described an overview of aspects of the technology described herein, an exemplary operating environment in which aspects of the technology described herein may be implemented is described below. Referring to the figures in general and initially to FIG. 1 in particular, an exemplary operating environment for implementing synthesizing an image is shown. This operating environment is merely one example of a suitable computing environment and is not intended to suggest any limitation as to the scope of use or functionality of aspects of the technology described herein. Neither should this operating environment be interpreted as having any dependency or requirement relating to any one component nor any combination of components illustrated.

Figure 1:
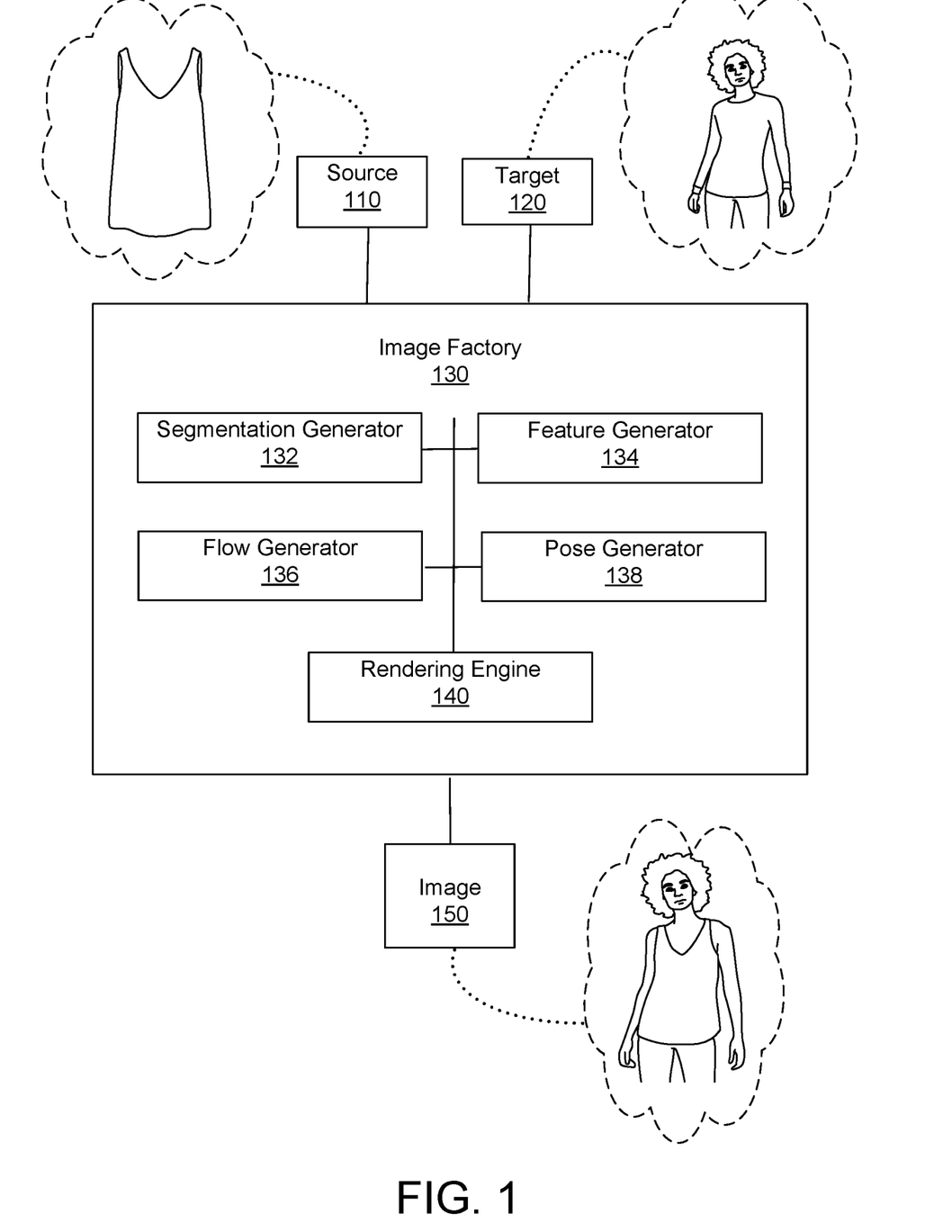
FIG. 1 is a block diagram illustrating an exemplary operating environment for implementing appearance-flow-based image generation, in accordance with at least one aspect of the technology described herein.

Turning now to FIG. 1, a block diagram is provided showing an operating environment in which some aspects of the present disclosure may be employed. It should be understood that this and other arrangements described herein are set forth only as examples. Other arrangements and elements (e.g. machines, interfaces, functions, orders, and grouping of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

In addition to other components not shown in FIG. 1, this operating environment includes image factory 130, which may take source 110 and target 120 as inputs, and output image 150 as a synthesized image. In this embodiment, image factory 130 also includes segmentation generator 132, feature generator 134, flow generator 136, pose generator 138, and rendering engine 140.

It should be understood that this operating environment shown in FIG. 1 is an example. Each of the system components shown in FIG. 1 may be implemented on any type of computing devices, such as computing device 700 described in FIG. 7, for example. Further, image factory 130 may communicate with various devices, or components in image factory 130 may communicate with each other, via a network, which may include, without limitation, a local area network (LAN) or a wide area network (WAN). In exemplary implementations, WANs include the Internet and/or a cellular network, amongst any of a variety of possible public or private networks.

Source 110 may be an image of a source object, for example, an image of an article of clothing, such as a V-neck tank top. Target 120 may be an image of a target object, for example, an image of a target person wearing a long sleeve blouse. In some embodiments, source 110 or target 120 includes photos taken by cameras, or edited parts of such photos. In some embodiments, source 110 or target 120 includes synthesized images or objects. By way of example, target 120 may include a modified object from source 110, such as by modifying the pose of the person in source 110.

Source 110 and target 120 are inputs to image factory 130. In various embodiments, image factory 130 analyzes its inputs to determine an appearance flow from source 110 to target 120, and subsequently warps source 110 based on the appearance flow to transfer the appearance of source 110 to target 120 in account for any required deformations.

To do that, pose generator 138 will determine a target pose, e.g., based on target 120. Segmentation generator 132 will generate a target segmentation map, e.g., based on the target pose, as well as generate a source segmentation map, e.g., based on source 110. In some embodiments, segmentation generator 132 is an encoder-decoder generator including a pretrained neural network for generating segments based on image segmentation techniques. A resulting segment is a set of pixels, also known as super-pixels, that share certain characteristics. Boundaries between two segments may also be identified. The resulting segmentation map may be a multi-channel binary map, such that each channel captures a specific semantic part of the image. For example, if the image is about a person, the segmentation map would include different parts, e.g., hair, face, arm, torso, leg, feet, etc.

Feature generator 134 will generate source features and target features, e.g., based on the source segmentation map, the target segmentation map, and source 110. Flow generator 136 is to determine an appearance flow for transferring the appearance of source 110 to target 120, e.g., based on the source features and the target features. In various embodiments, flow generator 136 is to determine the appearance flow from a cascade network, such as further illustrated in FIG. 4.

Rendering engine 140, in some embodiments, will warp source 110 based on the appearance flow, mask out one or more corresponding segments of target 120, and regenerate the masked segments to resemble the appearance of source 110. Resultantly, at least one part of image 150 may inherit its shape from target 120 and its appearance from source 110. By way of example, the person in image 150 may retain the pose of the person in target 120, but have changed her top from the long sleeve blouse to the V-neck tank top, with natural deformation of the V-neck tank top to conform to the pose.

Figure 2:
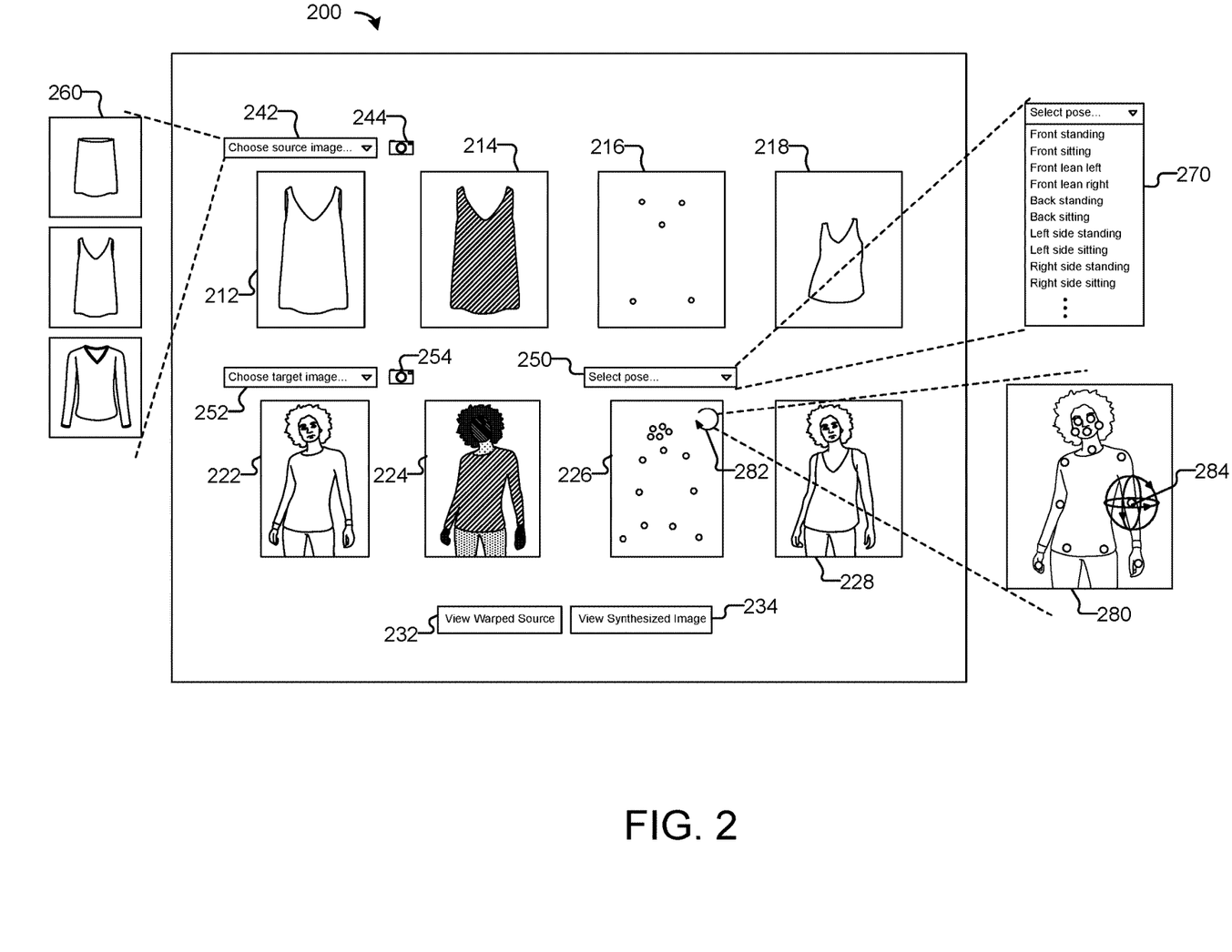
FIG. 2 is an example user interface for implementing appearance-flow-based image generation, in accordance with at least one aspect of the technology described herein.

Referring now to FIG. 2, a schematic representation is provided illustrating an exemplary user interface for appearance-flow-based image generation, which is designated generally as graphical user interface (GUI) 200, in accordance with at least one aspect of the technology described herein. For a virtual try-on task, given a product image (e.g., an article of clothing) and a character, the disclosed system is to synthesize the product onto the character with a target pose. When the character is a person, this virtual try-on task involves a process of pose-guide person image generation. The resulting person would have the target pose and also bear the appearance of the product.

In one embodiment, the product image is treated as the source, and the person's pose (or a modified version thereof) is treated as the target pose. The disclosed system is to estimate an appearance flow between the product image and the corresponding region on that person. In another embodiment, the target pose may be selected from a set of preconfigured poses or be further modified thereof. Further, a composition mask may be also applied with a loss encouraging the synthesized virtual try-on image to preserve clothing details in the warped product image. Therefore, the warped product image may be seamlessly transferred to the target person with fewer artifacts.

GUI 200 is a front end to achieve virtual try-on functions or other functions based on the appearance flow, such as character design. As illustrated, GUI 200 comprises different areas for comparatively presenting images. By way of example, one area may be designed for showing images related to the source. Another area may be designed for showing images related to the target image. Yet another area may be designed to present the synthesized image.

Further, GUI 200 contains multiple functional UI elements that are configured to greatly improve a user's experience, e.g., for selecting the source, selecting the target, selecting the pose, adjusting the pose, etc. Resultantly, in some embodiments, users may use GUI 200 to expediently and conveniently mix and match clothes online or virtually try on clothes. In other embodiments, users may use GUI 200 to design new characters, e.g., by changing the appearance of the character.

The specific locations of various GUI components as illustrated are not intended to suggest any limitation as to the scope of design or functionality of these GUI components. It has been contemplated that various UI elements may be rearranged without limiting the advantageous functions provided by GUI 200. As an example, switching the locations of the target image and the source image would not alter the design principle, and a comparative display of the source and the target can still be presented to users. Thus, a user can still obtain the comparative views and intuitively achieve the operational goal, whether it is for virtually trying on clothes or designing new characters.

When GUI 200 is used for a virtual try-on application, a user may choose a selfie (e.g., taken by activating UI element 254) or otherwise a photo of herself (e.g., by activating UI element 252) as the target for virtually trying on the article of clothing represented by the source. By way of example, when users are shopping online, they may utilize GUI 200, which is empowered by the disclosed technology, to see the synthesized appearance for trying on an article of clothing.

When GUI 200 is used for a design application, the designer may easily create the perfect outfit for a target character or design the character in general, e.g., by selecting and fitting different articles of clothing or accessories for the character. By way of example, a video game designer may utilize GUI 200, including the disclosed technology, to design different outfits for a character in different scenes.

Regardless of the actual applications, advantageously, GUI 200 is configured to offer its users instant photorealistic feedback with the disclosed technology herein. To do that, UI element 214 is configured to display the segmentation map of the source image, while UI element 216 is configured to show the representative key points of the source image. Similarly, UI element 224 is configured to display the segmentation map of the target image, UI element 226 is configured to show the representative key points of the pose corresponding to the target image. In some embodiments, the disclosed system uses a human parser to determine the segmentation map of a human character.

In one embodiment, UI element 242 is configured to enable a user to select a source image. By activating UI element 242, GUI 200 may cause a display of multiple potential source images from 260 for the user to choose from. The potential source images may be selected from a specific directory of the local file system or retrieved from a remote file system, such as from a computing cloud. Alternatively, the user may active camera 244, which is configured to enable the user to take a picture of the source in the real world, or enable the user to select an image from the storage related to her photo collection, such as her local or remote image storage. After a source is selected, UI element 212 is configured to display the chosen source. Similarly, UI element 252 and UI element 254 are configured to enable a user to choose a target.

A segmentation map shows multiple segments. In some embodiments, GUI 200 is configured to enable a user to select one or more segments from the segmentation for further processing. By way of example, the segmentation map of the target image may contain multiple segments, and the user may select one particular segment as the target segment to receive the appearance transferred from the source image or a corresponding segment in the segmentation map of the source image. In some embodiments, the disclosed technology will automatically identify the class of the source, and determine the corresponding segment of the target for appearance transfer.

GUI 200 is configured to enable users to select and modify the target pose in many different ways. UI element 226 may be used to display the target pose extracted from the target image. In some embodiments, the system uses a pose estimator to extract the target pose from the target image. Further, the target pose may be represented as coordinates of key points. In one embodiment, 17 key points are used to represent a pose.

Alternatively, UI element 226 may be used to display a preconfigured pose. The preconfigured pose may be selected, e.g., via UI element 250, which, once activated, may cause a set of preconfigured poses to load into UI element 270, which may be a pop-up window in one embodiment. Preconfigured poses (e.g., front standing, front sitting, front lean left, etc.) may be manually designed. In some embodiments, preconfigured poses may be learned from a machine learning model, e.g., features learned by a neural network from training images with different poses. Once a preconfigured pose is selected, it will be displayed on UI element 226, e.g., the key points representation of the selected pose, the character being transformed into the selected pose, or both, such as what is illustrated in UI element 280.

The pose displayed on UI element 226 may be modified, e.g., by modifying one or more key points representing the pose. In one embodiment, the user may directly manipulate the key points on UI element 226 to modify the pose. In another embodiment, after activating UI element 282, GUI 200 will pop up UI element 280, which displays a superimposed view by adding pose key points to the target image. In this way, users can intuitively modify the pose and view the character in the resulting pose instantly. For example, if the user drags key point 284 up, UI element 280 will display a person with lifted elbow instead.

In some embodiments, UI element 232, e.g., a button, is configured to enable a user to view the warped source image via UI element 218. Enabled by the disclosed technology, the source may be warped based on an appearance flow to account for the required deformations based on the target pose. As GUI 200 enables users to visually compare the warped source image and the original source image, users may evaluate whether the source has been naturally warped or whether any undesirable artifacts have been added.

UI element 234, on the other hand, is configured to enable a user to view the synthesized image via UI element 228. Enabled by the disclosed technology, the character in the synthesized image will inherit the original target pose or the modified target pose displayed on UI element 226, but at least one segment will inherit the appearance of the source, albeit with deformations to conform to the original target pose or the modified target pose.

Figure 3:
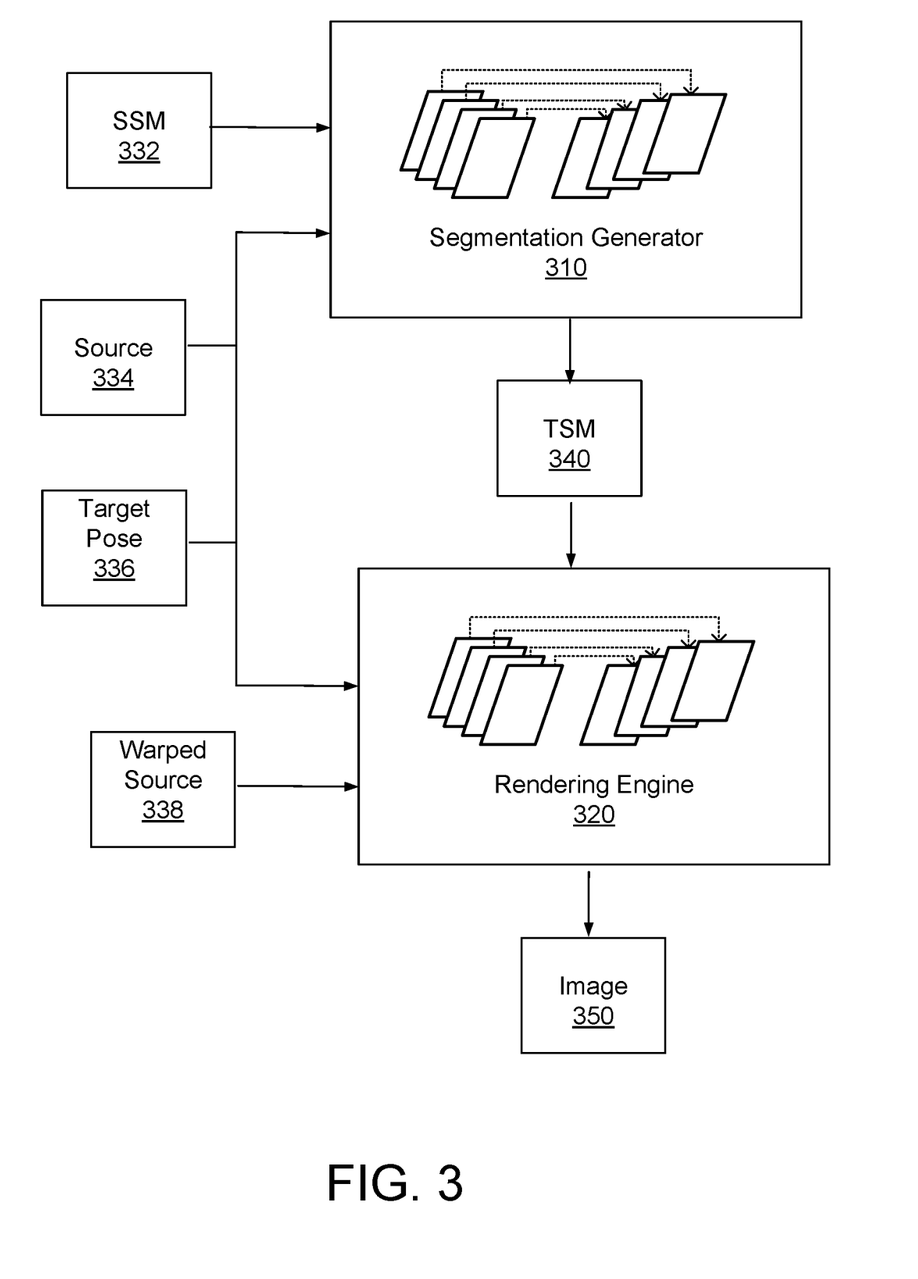
FIG. 3 is a schematic representation illustrating an exemplary image generation process, in accordance with at least one aspect of the technology described herein.

FIG. 3 is a schematic representation illustrating an exemplary image generation process, which is in accordance with at least one aspect of the technology described herein. In various embodiments, segmentation generator 310 generates a target segmentation map (TSM) (depicted as TSM 340), based on a source segmentation map (depicted as SSM 332), the source image (depicted as source 334), and a target pose (depicted as target pose 336). TSM 340 may be used to guide the estimation of the appearance flow in a cascaded appearance flow estimation network, such as refiner 420 in FIG. 4. In turn, the estimated appearance flow may be used for warping source 334 to become warped source 338. Rendering engine 320 may include an encoder-decoder generative network. Subsequently, rendering engine 320 may synthetize image 350 based on TSM 340, source 334, target pose 336, and warped source 338.

When synthesizing person images, segmentation generator 310 is to predict a semantic layout (e.g., TSM 340) that poses structural constraints for the generation of appearance at a later stage. In this way, the disclosed system may separate the task of synthesizing the target layout (e.g., the shape) from the task of synthesizing the appearance (e.g., the clothing details).

To obtain target pose 336, the disclosed system (e.g., pose generator 138 in FIG. 1) may use a pose estimator and a human parser in one embodiment. More specifically, the pose estimator predicts 2D coordinates of person key points, which are then converted to a heatmap where each channel captures the spatial information of a key point by filling in with ones for a circle with a radius of several pixels at that key point and zeros elsewhere.

In some embodiments, the disclosed system (e.g., segmentation generator 132 in FIG. 1) may encode a segmentation map (e.g., SSM 332 or TSM 340) as a multi-channel binary map, such that each channel captures a specific semantic human part, e.g., hair, face, arm, torso, leg, foot, etc.

For the purpose of the following discussion, the segmentation map (i.e., the semantic layout) of the source image and the target image may be denoted as $s_s$ and $S_t$, respectively. Further, segmentation generator 310 may be denoted as $G_{layout}$) which includes an encoder-decoder network in some embodiments. $G_{layout}$ may then take source 334 (denoted as $I_s$), SSM 332 (denoted as $s_s$), and target pose 336 (denoted as $p_t$) to estimate the target segmentation map, e.g., TSM 340, via Eq. 1, by minimizing the pixel-wise cross entropy loss between $s_t$ and $\hat{s}_t$.

$$\hat{s}_t = G_{layout}(I_s, s_s, p_t) \qquad \text{Eq. 1}$$

Note that compared to generating texture details, predicting a semantic layout of target image is less challenging, as it does not require generating textures or explicit modeling of geometric transformation. Nevertheless, the generated target semantic layout, as an intermediate guidance, not only helps to obtain a more accurate appearance flow but also enforces structural constraints when rendering engine 320 generates the appearance details (e.g., clothing textures) for image 350.

To render image 350, rendering engine 320 takes warped source 338 (denoted as $c_s'$) together with other inputs, including source $I_s$, target segmentation map $s_t$, and target pose $p_t$, to produce the final result $\hat{I}_t$ with an encoder-decoder generative network. A person skilled in the art may also understand that during training, the ground truth target segmentation map $s_t$ may be used for rendering engine 320 to render image 350. At test or inference time, if $s_t$ is not accessible, the synthesized target segmentation map $\hat{s}_t$ may be used to render image 350. Two losses may be combined to generate a high-quality result $\hat{I}_t$ as shown in Eq. 2.

$$L_{render} = L_{perc} + L_{style} \quad \text{Eq. 2}$$

$$L_{style} = \sum_{l=1}^{5} \gamma_l \| \mathcal{G}_l(\hat{I}_t) - \mathcal{G}_l(I_t) \|_1 \quad \text{Eq. 3}$$

In Eq. 2, $L_{perc}$ is the perceptual loss between $I_t$ and $\hat{I}_t$ as defined in Eq. 7 below. In one embodiment, $\mathcal{G}_l$ is the Gram matrix for the layer (l) in the pretrained Visual Geometry Group (VGG) network. In Eq. 2, $L_{style}$ is the style loss for style transfer tasks to match the style information of two images, as defined in Eq. 3. Adding the style loss guides, rendering engine 320 is to transfer texture details in warped source 338 to image 350.

Figure 4:
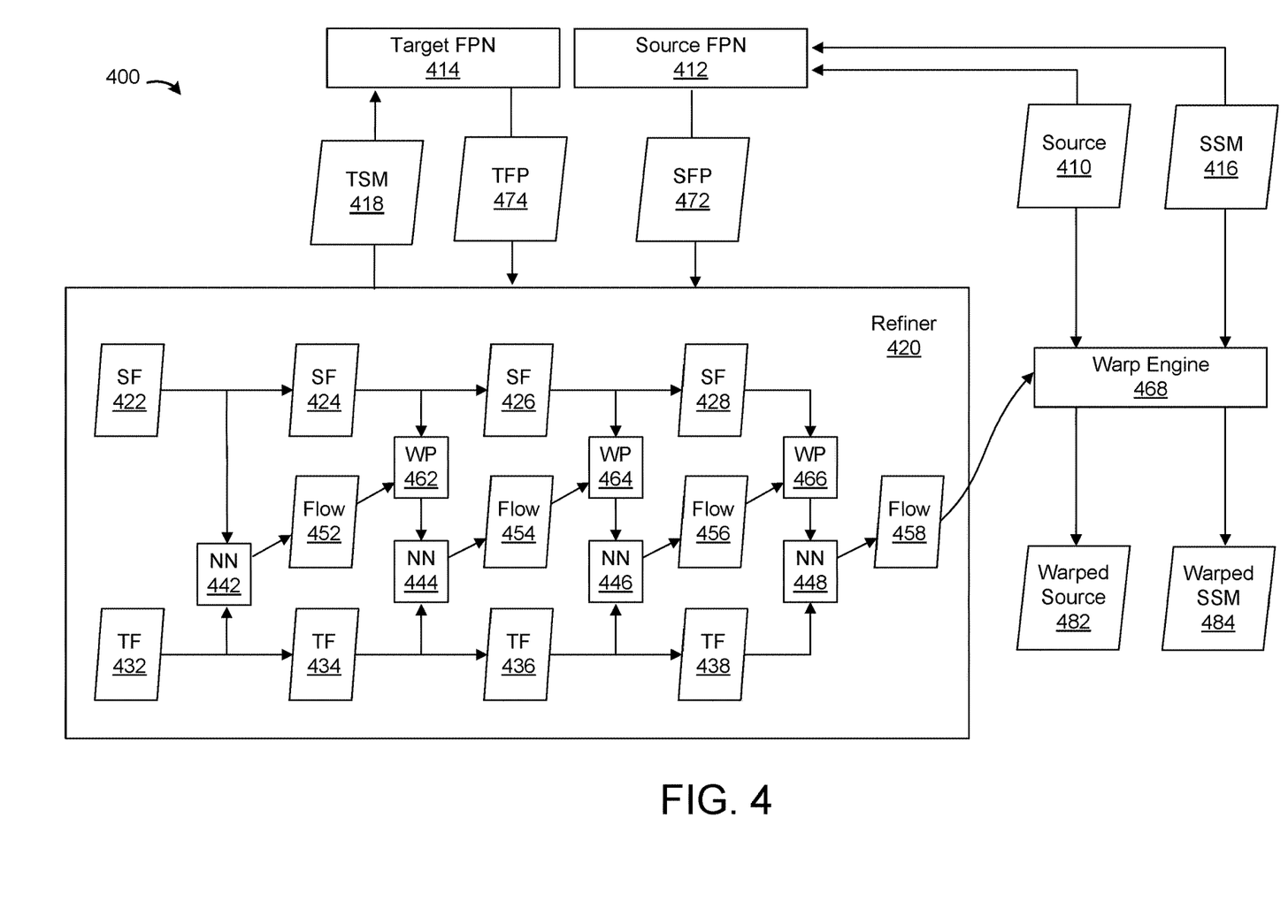
FIG. 4 is a schematic representation illustrating an exemplary appearance flow generator, in accordance with at least one aspect of the technology described herein.

Referring now to FIG. 4, a schematic representation is provided illustrating an exemplary appearance flow generator (AFG), denoted as AFG 400 hereinafter. When the source (e.g., clothes) is highly deformable, which may present very large misalignment in the target and source image, directly estimating the appearance flow is difficult. AFG 400 employs a cascaded warping network with pyramidal architectures for gradually refining the estimation of the appearance flow.

In various embodiments, AFG 400 includes two feature pyramid networks (FPN) (e.g., source FPN 412 and target FPN 414) for encoding feature information (e.g., geometric information) of the source and the target. Respective features of the source and the target (e.g., SFP 472 and TFP 474) may be used by refiner 420 to progressively refine the estimation of an appearance flow between the source and the target in a cascaded manner. To transfer the appearance of source 410 to the target, the resulting appearance flow (e.g., flow 458) is then used to warp source 410, e.g., via warp engine 468, in account for required deformations.

In some embodiments, source FPN 412 consists of N encoding layers where each layer has a downsample convolution with a stride of 2 followed by 2 residual blocks. The features after the second residual block in each encoding layer are used to build the source feature pyramid (SFP) (e.g., SFP 472), resulting in a set of source features (SF) $\{S_1, S_2, \ldots, S_N\}$, e.g., SF 422, SF 424, SF 426, and SF 428. Although N is set to be 4 in FIG. 4 for the purpose of illustration, in other embodiments, N may be set to be 3 or 5, or other integer numbers based on the specific application of the disclosed technology. Target FPN 414 has the similar network structure as source FPN 412, and target FPN 414 generates the target feature pyramid (TFP) (e.g., TFP 474), including a set of target features (TF) $\{T_1, T_2, \ldots, T_N\}$, e.g., TF 432, TF 434, TF 436, and TF 438. Then, the extracted pyramidal features, SFP 472 and TFP 474, will be used to estimate the appearance flow from the source to the target in a cascaded manner via refiner 420.

In some embodiments, source FPN 412 and target FPN 414 may share the same neural network structure, but use different weights because they encode different modalities with different inputs. The inputs to source FPN 412 include source 410 and SSM 416, while the inputs to target FPN 414 include TSM 418. In some embodiments, source 410 includes the selected clothing region or regions of the source image that need to be warped or transferred. SSM 416 is the source segmentation map or another representation of the source semantic layout, while TSM 418 is the target segmentation map or another representation of the target semantic layout.

In the context of clothing transfer applications, TSM 418 represents the predicted semantic segmentation map or layout, which can provide valuable clues of how each clothing item is spatially transformed in the target view. Further, source 410, SSM 416, or TSM 418 may be used to focus on modeling the flow of different clothing regions (e.g., hats, pants, tops, dresses), as the skin regions do not have complicated textures and can be handled by a common generative model.

Refiner 420 uses SFP 472 and TFP 474 to estimate a dense appearance flow, e.g., 2×H×W where H, W denote the image size, between the source and the target. In a cascade network, each cascade will refine the appearance flow based on corresponding features from SFP 472 and TFP 474. A neural network (NN), or a convolutional layer of a convolutional neural network (CNN), may be used to produce or refine the appearance flow between a pair of pyramidal features, e.g., from the source to the target. In this embodiment, NN 442, NN 444, NN 446, and NN 448 are depicted as such neural networks or respective convolutional layers.

Refiner 420 may start the flow refinement process with SF 422 and TF 432, which, in some embodiments, are the first level or the lowest resolution pyramidal features of SFP 472 and TFP 474 respectively. Refiner 420 may feed the concatenated SF 422 and TF 432 to NN 442 to produce the initial appearance flow, denoted as flow 452. The present appearance flow may be used to warp the source features at the next level of the source feature pyramid, which may have a higher resolution. In this case, flow 452 is used to warp SF 424 via a warping process, denoted as WP 462. Next, NN 444 takes the warped source features and the target features at the next level of the target feature pyramid, which is TF 434, to produce a refined appearance flow (flow 454).

This refinement process is repeated for each cascade in this cascade network. For example, SF 426 is warped by flow 454 via WP 464, and then NN 446 uses TF 436 and the warped SF 426 to produce flow 456. Further, SF 428 is warped by flow 456 via WP 466, and then NN 448 uses TF 438 and the warped SF 428 to produce flow 458. The final appearance flow may then be used by warp engine 468 to warp source 410 to become warped source 482, or to warp SSM 416 to become warped SSM 484.

Using a cascade network, refiner 420 can determine a layerwise flow at each cascade. The layerwise flow may be used to estimate the next layerwise flow at the next cascade. The warped source features are used to estimate a residual flow for refinement of the rough flow in the previous level. These processes continue until the network generates the finest flow that helps align small displacement between the source and the target. In this way, AFG 400 directly models large misalignment via low-level flows (e.g., flow 452) based on low-resolution pyramidal features (e.g., SF 422 and TF 432) as well as small displacement via high-level flows (e.g., flow 458) based on high-resolution pyramidal features (e.g., SF 428 and TF 438). Advantageously, the final appearance flow, produced by refiner 420 in this cascaded manner, when used to warp the source and estimate the visual correspondences, can transfer the appearance of the source to the target with natural-looking deformations, e.g., guided by a target pose.

The formal process used by AFG 400 and the objective functions used by refiner 420 are further discussed below. In various embodiments, the estimation of appearance flow starts at the pyramidal features with the lowest resolution. The concatenated source features and target features at layer N, denoted as $S_N$ and $T_N$, may be inputted to a convolutional layer, denoted as $E_N$, to produce a flow $F_N$. Then, for the features at a higher-level layer, the source feature may be warped based on $F_N$. The process may be repeated in refining $F_N$ by predicting the residual flow with a subsequent convolutional layer $E_{N-1}$, as formally illustrated in Eq. 4 and Eq. 5, where n=N, N−1, . . . , 2; $\mathcal{U}$ is a×2 nearest-neighbor upsampling and $\mathcal{W}$ (S, F) denotes warping feature map S according to flow F using bilinear interpolation, which enables optimization with back-propagation during training. Finally, the last appearance flow $F_1$ may be used to generate a warped source ($c'_s$) based on Eq. 6.

$$F_N = E_N([S_N, T_N]) \qquad \text{Eq. 4}$$

$$F_{n-1} = \mathcal{U}(F_n) + E_{n-1}([\mathcal{W}(S_{n-1}, \mathcal{U}(F_n)), T_{n-1}]) \qquad \text{Eq. 5}$$

$$c'_s = \mathcal{W}(c_s, \mathcal{U}(F_1)) \qquad \text{Eq. 6}$$

In this way, refiner 420 models the appearance flow to account for coarse-grained deformations based on low-resolution features (e.g., high-level CNN features) as well as fine-grained deformations based on high-resolution features (e.g., low-level CNN features). Resultantly, the final appearance flow enables appearance transfer even with large misalignment and significant deformations, which usually occur in clothing transfer.

Further, to make the visual appearance of warped clothing $c'_s$ to be the same as the target clothing region $c_t$, a perceptual loss between $c'_s$ and $c'_s$ is minimized based on Eq. 7. In some embodiments, $\phi(I)$ is the l-th feature map of image I in a VGG19 network pre-trained on ImageNet with $\phi_0(x) = x$ denoting pixel $L_1$ loss.

$$L_{perc}(c'_s, c_t) = \sum_{l=0}^{5} \lambda_l \|\phi_l(c'_s) - \phi_l(c_t)\|_1 \qquad \text{Eq. 7}$$

Sometimes only minimizing $L_{perc}(c'_s, c_t)$ may produce inaccurate warping and introduce undesired misalignment, e.g., when different clothing items have similar visual patterns, when the network cannot accurately determine the boundaries between different segments. To address this issue, AFG 400 uses a structure loss to enforce structural constraints of warped regions in some embodiments. Specifically, the source semantic segmentation map (e.g., SSM 416) is also warped according to the estimated appearance flow based on Eq. 8, then the structural loss between the source semantic segmentation map and warped source semantic segmentation map is minimized based on Eq. 9, where the subscript i denotes the channel index of a segmentation map (i.e., a specific clothing category). $\mathbb{1}$ is an indicator function, and thus $\mathbb{1}(S_{s,i})\mathbb{1}(S_{t,i})$ specifies if category i exists both in the source and target image.

$$s'_s = (W(s_s, \mathcal{U}(F_1)) \qquad \text{Eq. 8}$$

$$L_{struct}(s'_s, s_t) = \sum_i \mathbb{1}(s_{s,i}) \mathbb{1}(s_{t,i}) \|s'_{s,i} - s_{t,i}\|_1 \qquad \text{Eq. 9}$$

In some embodiments, the perceptual loss may be modified further to be aware of each region-of-interest (ROI) based on Eq. 10, which guides the disclosed model to focus on warping the texture specific for each ROI. Consequently, each warped ROI will not be affected by other regions or the background, yielding a more coherent warping result.

$$L_{roi\_perc}(c'_s, c_t, s'_s, s_t) = \sum_{l=0}^{5} \lambda_l \sum_i \mathbb{1}(s_{s,i}) \mathbb{1}(s_{t,i}) \|\phi_l(s'_{s,i} \odot c'_s) - \phi_l(s_{t,i} \odot c_t)\|_1 \qquad \text{Eq. 10}$$

Further, in some embodiments, a total variation loss, e.g., based on Eq. 11, is introduced to regularize the estimated appearance field to be smoother, particularly to prevent unappealing artifacts caused by using dense flows without proper regularizations. The whole objective function of the cascaded warping network, e.g., refiner 420, thus can be constructed based on Eq. 12, using x to balance the different losses.

$$L_{smt} = \sum_{n=1}^{N} \|\nabla F_n\|_1 \qquad \text{Eq. 11}$$

$$L_{flow} = L_{roi\_perc} + \lambda_{struct} L_{struct} + \lambda_{smt} L_{smt} \qquad \text{Eq. 12}$$

The resulting appearance flow is dense, smooth, and has a high dimension of freedom. Advantageously, the disclosed technology allows pixel-to-pixel matching between the source and the target, leading to a better estimation of geometric changes and photorealistic results. Experimental results also demonstrate the high robustness of the disclosed technology to occlusions, partial observability, and large deformations.

Figure 5:
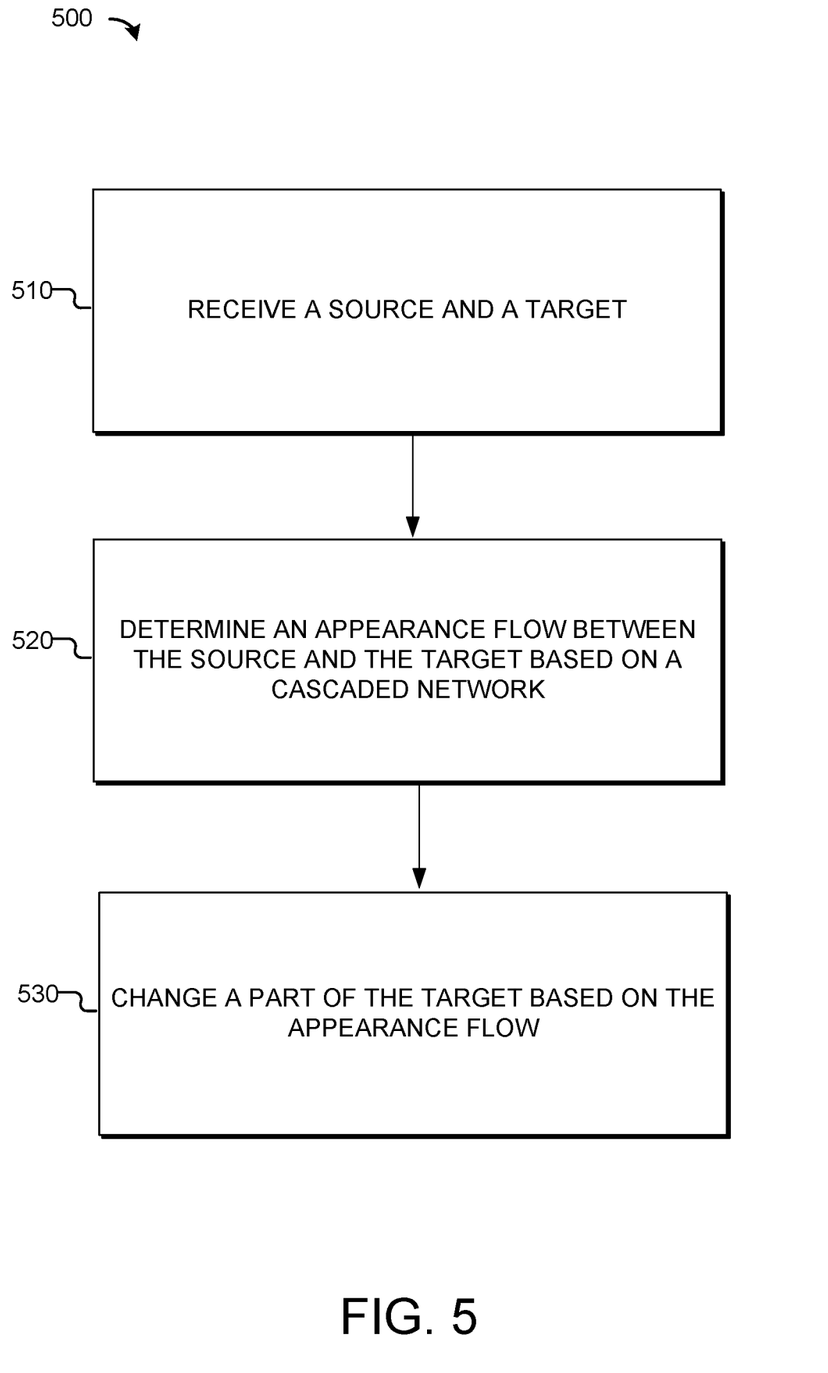
FIG. 5 is a flow diagram illustrating an exemplary process of appearance-flow-based image generation, in accordance with at least one aspect of the technology described herein.

Referring now to FIG. 5, a flow diagram is provided that illustrates an exemplary process of appearance-flow-based image generation. Each block of process 500, and other processes described herein, comprises a computing process that may be performed using any combination of hardware, firmware, or software. For instance, various functions may be carried out by a processor executing instructions stored in memory. The process may also be embodied as computer-usable instructions stored on computer storage media or devices. The process may be provided by an application, a service, or a combination thereof.

At block 510, a source and a target may be received by, e.g., image factory 130 of FIG. 1, or via a user interface, e.g., GUI 200 of FIG. 2. In some embodiments, the source is an image of a desired object, such as a tank top associated with UI element 212 in FIG. 2. In some embodiments, the source could be one or more selected regions of a source image, such as one or more clothed regions. Similarly, in some embodiments, the target is an image of an object, such as a person associated with UI element 222 in FIG. 2. In some embodiments, the target could be one or more regions in the target image that correspond to the source. In various embodiments, the appearance of the source is to be transferred to the target.

At block 520, based on a cascaded network, an appearance flow between the source and the target may be determined, e.g., by the flow generator 136 of FIG. 1 or refiner 420 of FIG. 4. In various embodiments, one step is to determine the respective feature pyramids of the source and the target, e.g., based on suitable feature pyramid networks. Another step is to determine, based on the layerwise features of the respective feature pyramids of the source and the target, the appearance flow with a cascaded network in a cascaded manner. The appearance flow is refined in each cascade such that the appearance flow can capture information of both coarse-grained large deformations and fine-grained small deformations for appearance transfer.

At block 530, at least a part of the target is changed based on the appearance flow by, e.g., rendering engine 140 of FIG. 1 or the rendering engine 320 in FIG. 3. In various embodiments, one step is to warp the source based on the appearance flow, e.g., by warp engine 468. Another step is to render, guided by a target pose, a new image based on the warped source and other parts of the target. This process has also been discussed in connection with FIG. 1, FIG. 3, and FIG. 4.

Figure 6:
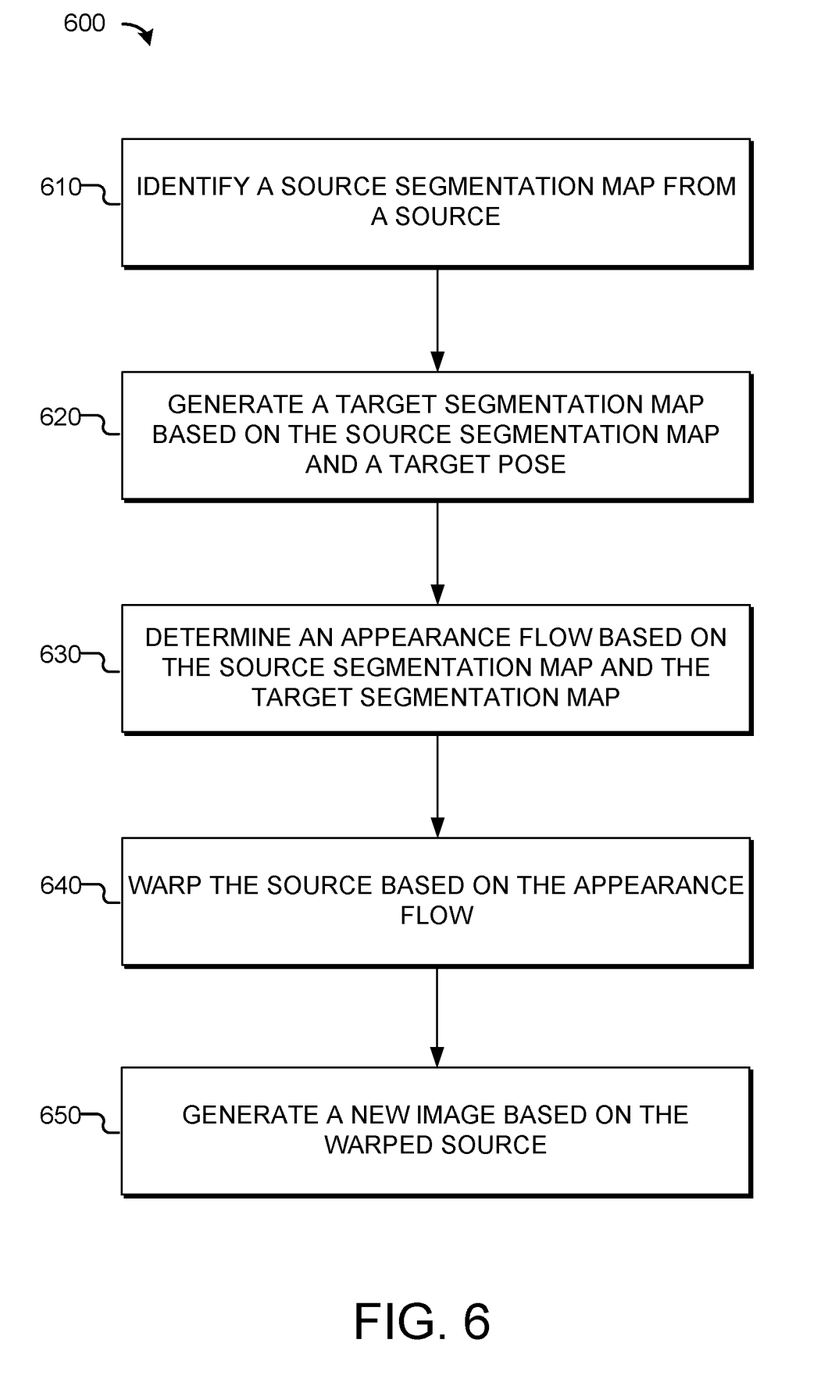
FIG. 6 is a flow diagram illustrating another exemplary process of appearance-flow-based image generation, in accordance with at least one aspect of the technology described herein.

Turning now to FIG. 6, a flow diagram is provided to illustrate another exemplary process of appearance-flow-based image generation. Each block of process 600, and other processes described herein, comprises a computing process that may be performed using any combination of hardware, firmware, or software. For instance, various functions may be carried out by a processor executing instructions stored in memory. The processes may also be embodied as computer-usable instructions stored on computer storage media or devices. The process may be provided by an application, a service, or a combination thereof.

At block 610, the process is to identify a source segmentation map from a source, e.g., by segmentation generator 132 of FIG. 1. Various image segmentation methods may be used to obtain the source segmentation map, e.g., the thresholding methods, the clustering methods, the compression-based methods, the edge detection methods, etc. For image segmentation related to a person, some neural network based models are also used to obtain the semantic layout of the person in the image, including the different parts of a person, such as the head, the arm, the leg, etc.

At block 620, the process is to generate a target segmentation map based on the source segmentation map and a target pose, e.g., by segmentation generator 310 of FIG. 3. As discussed previously, in some embodiments, a neural network with an encoder-decoder structure may be used to estimate the target segmentation map based on the source image, the source segmentation map, and the target pose, by minimizing the pixel-wise cross entropy loss between the source segmentation map and the target segmentation map.

In some embodiments, the target pose is selected from preconfigured poses, such as discussed in connection with FIG. 2. In some embodiments, the target pose can be further modified by a user, such as discussed in connection with FIG. 2. In various embodiments, a pose estimator may be used to estimate a pose associated with a person in the image. Further, a pose may be presented by a set of key points.

At block 630, the process is to determine an appearance flow based on the source segmentation map and the target segmentation map, e.g., by flow generator 136 of FIG. 1. For example, AFG 400 of FIG. 4 may generate respective feature pyramids based on the source segmentation map and the target segmentation map. Further, AFG 400 may sequentially use features at the corresponding levels of the respective feature pyramids to generate and refine the appearance flow in a cascaded manner. In this way, the appearance flow is configured to handle both large and small deformations required to naturally transfer the appearance of the source to the target.

At block 640, the process is to warp the source based on the appearance flow, e.g., by warp engine 468 of FIG. 4. The warping information for the geometric transformation is coded in the appearance flow, which specifies correlated pixels between the source and the target. In various embodiments, this block is to reconstruct, based on the appearance flow, the target with correlated pixels from the source.

At block 650, the process is to generate a new image based on the warped source, e.g., by rendering engine 320 of FIG. 3. In various embodiments, the new image would conform to the target pose, and at least the relevant part of the new image would resemble the appearance of the source. In some embodiments for clothing transfer or virtual try-on, a composition mask may be used to preserve parts of the target image. Then, the warped source may be used to fill in either the masked part or unmasked part of the target image. Advantageously, the resulting synthetic image would precisely model the necessary deformations between different views and naturally transfer appearance details.

Accordingly, we have described various aspects of the technology for detecting mislabeled products. It is understood that various features, sub-combinations, and modifications of the embodiments described herein are of utility and may be employed in other embodiments without reference to other features or sub-combinations. Moreover, the order and sequences of steps shown in the above example processes are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 7:
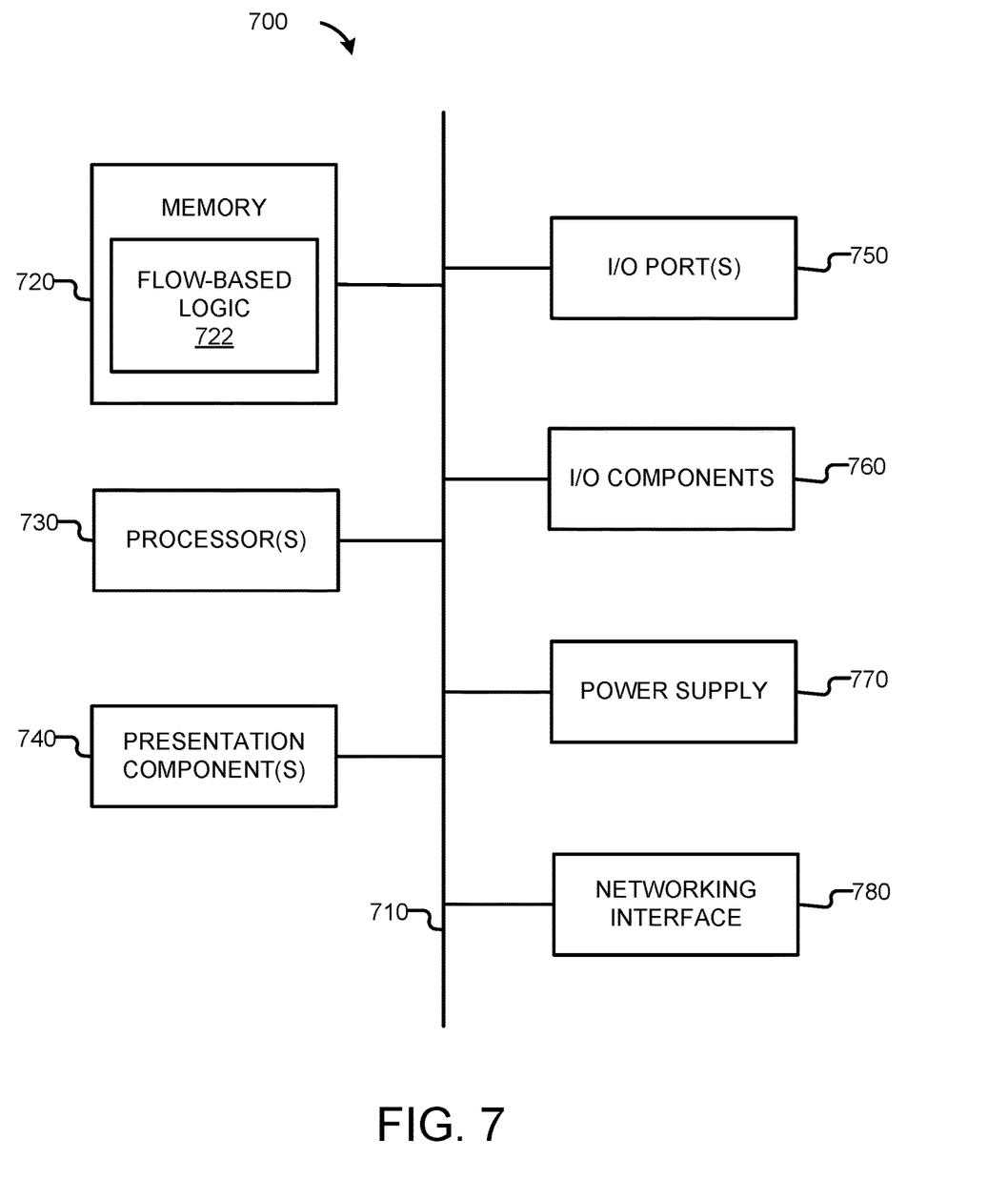
FIG. 7 is a block diagram of an exemplary computing environment suitable for use in implementing various aspects of the technology described herein.

Referring to FIG. 7, an exemplary operating environment for implementing aspects of the technology described herein is shown and designated generally as computing device 700. Computing device 700 is but one example of a suitable computing environment and is not intended to suggest any limitation as to the scope of use of the technology described herein. Neither should the computing device 700 be interpreted as having any dependency or requirement relating to any one or combination of components illustrated.

The technology described herein may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, and specialty computing devices, etc. Aspects of the technology described herein may also be practiced in distributed computing environments where tasks are performed by remote-processing devices that are connected through a communications network.

With continued reference to FIG. 7, computing device 700 includes a bus 710 that directly or indirectly couples the following devices: memory 720, processors 730, presentation components 740, input/output (I/O) ports 750, I/O components 760, and an illustrative power supply 770. Bus 710 may include an address bus, data bus, or a combination thereof. Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. The inventors hereof recognize that such is the nature of the art and reiterate that the diagram of FIG. 7 is merely illustrative of an exemplary computing device that can be used in connection with different aspects of the technology described herein. Distinction is not made between such categories as "workstation," "server," "laptop," "handheld device," etc., as all are contemplated within the scope of FIG. 7 and refers to "computer" or "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 720 includes computer storage media in the form of volatile and/or nonvolatile memory. The memory 720 may be removable, non-removable, or a combination thereof. Exemplary memory includes solid-state memory, hard drives, optical-disc drives, etc. Computing device 700 includes processors 730 that read data from various entities such as bus 710, memory 720, or I/O components 760. Presentation component(s) 740 present data indications to a user or other device. Exemplary presentation components 740 include a display device, speaker, printing component, vibrating component, etc. I/O ports 750 allow computing device 700 to be logically coupled to other devices, including I/O components 760, some of which may be built in.

In various embodiments, memory 720 includes, in particular, temporal and persistent copies of flow-based logic 722. Flow-based logic 722 includes instructions that, when executed by processor 730, result in computing device 700 performing functions, such as, but not limited to, processes 500 and 600. In various embodiments, flow-based logic 722 includes instruction that, when executed by processors 730, result in computing device 700 performing various functions associated with, but not limited to segmentation generator 132, feature generator 134, flow generator 136, pose generator 138 in connection with FIG. 1; segmentation generator 310, and rendering engine 320 in connection with FIG. 3; and refiner 420, target FPN 414, source FPN 412, and warp engine 468 in connection with FIG. 4.

In some embodiments, processors 730 may be packed together with flow-based logic 722. In some embodiments, processors 730 may be packaged together with flow-based logic 722 to form a System in Package (SiP). In some embodiments, processors 730 cam be integrated on the same die with flow-based logic 722. In some embodiments, processors 730 can be integrated on the same die with flow-based logic 722 to form a System on Chip (SoC).

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 730 may be direct or via a coupling utilizing a serial port, parallel port, and/or other interface and/or system bus known in the art. Furthermore, the digitizer input component may be a component separate from an output component such as a display device. In some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

Computing device 700 may include networking interface 780. The networking interface 780 includes a network interface controller (NIC) that transmits and receives data. The networking interface 780 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 780 may include a wireless terminal adapted to receive communications and media over various wireless networks. Computing device 700 may communicate with other devices via the networking interface 780 using radio communication technologies. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A bluetooth connection to another computing device is a second example of a short-range connection. A long-range connection may include a connection using various wireless networks, including 1G, 2G, 3G, 4G, 5G, etc., or based on various standards or protocols, including General Packet Radio Service (GPRS), Enhanced Data rates for GSM Evolution (EDGE), Global System for Mobiles (GSM), Code Division Multiple Access (CDMA), Time Division Multiple Access (TDMA), Long-Term Evolution (LTE), 802.16 standards, etc.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. A computer-readable storage device encoded with instructions that, when executed, cause one or more processors of a computing system to perform operations comprising:
   identifying a source segmentation map of a source object in a source image;
   synthesizing a target segmentation map based on the source segmentation map and a target pose of a target object;
   determining an appearance flow based on the source segmentation map and the target segmentation map, the appearance flow being configured for correlating respective pixels between a part of the source object and a part of the target object;
   refining the appearance flow based on a combination of a structural regulation, a smooth regulation, and a category-level perceptual loss;
   warping the part of the source object based on the appearance flow; and generating a target image based on the target pose and the part of the source object.

2. The computer-readable storage device of claim 1, wherein the source segmentation map comprises a multi-channel binary map with each channel corresponding to a semantic part of the source object.

3. The computer-readable storage device of claim 1, wherein determining the appearance flow comprises:
   generating a source feature pyramid based on the source segmentation map;
   generating a target feature pyramid based on the target segmentation map; and
   determining the appearance flow from a plurality of cascades, wherein the appearance flow is refined at each cascade of the plurality of cascades based on features from corresponding levels of the source feature pyramid and the target feature pyramid.

4. The computer-readable storage device of claim 1, wherein generating the target image comprises rendering the target image based on the target segmentation map and the target pose.

5. The computer-readable storage device of claim 1, wherein generating the target image comprises rendering the target image based on the source image and the target segmentation map.

6. The computer-readable storage device of claim 1, wherein the target object is a computer-generated character in a video, wherein generating the target image comprises rendering the computer-generated character with semantic parts corresponding to the source object.

7. A computer-implemented method for flow-based image generation, comprising:
   determining an appearance flow between a first segment of a source image and a second segment of a target image, the appearance flow being configured for correlating a plurality of pixels between the first segment and the second segment;
   reducing a perceptual loss between the first segment and the second segment, wherein the perceptual loss comprises weighted differences between corresponding features of the first segment and the second segment;
   warping the first segment based on the appearance flow; and
   generating a composite image based on the first segment.

8. The method of claim 7, wherein the first segment and the second segment share a common categorical label.

9. The method of claim 7, wherein determining the appearance flow comprises:
   estimating an initial appearance flow in a first cascade based on a first pyramidal feature related to the first segment and a second pyramidal feature related to the second segment; and
   revising the initial appearance flow in a second cascade based on a third pyramidal feature related to the first segment and a fourth pyramidal feature related to the second segment.

10. The method of claim 9, wherein revising the initial appearance flow comprises warping the third pyramidal feature based on the initial appearance flow.

11. The method of claim 9, wherein the third pyramidal feature is at a lower level than the first pyramidal feature in a first pyramidal feature space for the first segment, and the fourth pyramidal feature is at a lower level than the second pyramidal feature in a second pyramidal feature space for the second segment.

12. The method of claim 7, wherein determining the appearance flow further comprises:
   warping a first segmentation map of the source image; and
   reducing a second perceptual loss between the segmentation map and a second segmentation map of the target image, wherein the second perceptual loss is determined based on differences of corresponding co-existing categories of the first segmentation map and the second segmentation map.

13. The method of claim 7, wherein determining the appearance flow further comprises:
   warping a first segmentation map of the source image, wherein the first segmentation map comprises a plurality of categories; and
   reducing a second perceptual loss between a first combination and a second combination, wherein the first combination comprises the first segment and the first segmentation map, the second combination comprises the second segment and a second segmentation map of the target image, the second perceptual loss is determined based on differences between the first combination and the second combination in respective categories of the plurality of categories.

14. The method of claim 7, further comprising:
   estimating a pose of a character from the target image; and
   determining a segmentation map of the character, wherein generating the composite image comprises generating the composite image further based on the pose and the segmentation map.

15. The method of claim 14, wherein the first segment of the source image comprises an item of clothing worn by another character, and wherein generating the composite image comprises generating the character wearing the item of clothing.

16. A system for flow-based image generation, comprising:
   a processor; and
   a memory having instructions stored thereon, wherein the instructions, when executed by the processor, cause the processor to:

determine an appearance flow between a first segment of a source image and a second segment of a target image, the appearance flow being configured for correlating a plurality of pixels between the first segment and the second segment;

refine the appearance flow in each of a plurality of cascades based on respective features related to the source image and the target image;

warp the first segment based on the appearance flow; and generate a composite image based on the first segment.

17. The system of claim 16, wherein the first segment comprises an item of clothing, and the composite image comprises a character wearing the item of clothing.

* * * * *